United States Patent [19]

Lacatus et al.

[11] Patent Number: 4,755,414

[45] Date of Patent: Jul. 5, 1988

[54] WEATHERABLE RIGID VINYL ARTICLES

[75] Inventors: Emilia E. Lacatus, North Olmsted; Elvira B. Rabinovitch, South Euclid; James W. Summers, Bay Village, all of Ohio

[73] Assignee: The BF Goodrich Company, Akron, Ohio

[21] Appl. No.: 128,138

[22] Filed: Dec. 3, 1987

Related U.S. Application Data

[62] Division of Ser. No. 868,857, May 30, 1986, Pat. No. 4,728,677.

[51] Int. Cl.$^4$ .......................... B32B 3/00; E04C 1/00
[52] U.S. Cl. ..................................... 428/156; 52/309.1
[58] Field of Search ....................... 428/156; 52/309.1

[56] References Cited

U.S. PATENT DOCUMENTS 3,644,246  2/1972  Lozanou .......................... 260/23 XA
4,424,292  1/1984  Rabinovitch et al. ................ 524/88

*Primary Examiner*—Joseph L. Schofer
*Assistant Examiner*—N. Sarofim
*Attorney, Agent, or Firm*—Joe A. Powell

[57] ABSTRACT

The invention relates to a vinyl halide polymer composition suitable for outdoor use in the sunlight. The change in color as measured by $\Delta E$ in articles made from the polymeric composition is found to be substantially lower than other compositions. The lower $\Delta E$ provides a measurement for improved weatherability of the compositions in such applications as housing siding, window profiles, shutters and roof vents.

4 Claims, No Drawings

WEATHERABLE RIGID VINYL ARTICLES

This is a division of application Ser. No. 868,857 filed May 30, 1986, now U.S. Pat. No. 4,728,677.

BACKGROUND OF THE INVENTION

Polymeric materials such as a homopolymer or copolymer of vinyl, and products made therefrom, must exhibit resistance to degradation if they are to have any useful commercial value, particularly for outdoor use, such as in house siding, window profiles such as main frame, sash, glazing beads, and the like. The degradation referred to can be a partial or total loss of structural integrity, color change of the product, such as lightening or darkening, a loss of flexibility or resilience, loss of shape due to softening, or a combination of any of these phenomena. The various types of degradation, above referred to, are promoted or catalyzed by oxygen (air), heat, and light, particularly sunlight in the ultraviolet (UV), visible, and infrared (IR) ranges.

In order to protect polymeric materials, it has been the practice heretofore to add various ingredients or stabilizers to the polymers, or compounds thereof, to prevent or inhibit degradation of finished articles made therefrom. These stabilizers work in diverse and complex ways, such that a compound that stabilizes against heat and oxygen degradation in a polymer or resin may not stabilize the same against light degradation, or vice versa. In many instances, to obtain optimum protection, a mixture of compounds, each specifically selected to afford maximum protection against a certain type of degradation, is often used.

It is well known that absorption of light energy from the sun causes a temperature rise in articles exposed to the sun. This is a particularly bad problem in the case of vinyl house siding since it causes "oil canning" of the siding which is a surface distortion. Vinyl and other plastic materials require ultraviolet absorbers for protection during weathering. These absorbers may be organic materials, titanium dioxide, carbon black, etc. However, by absorbing the ultraviolet light, the articles are heated by the ultraviolet light. Also, pigments which absorb or reflect in the visible light region are sometimes added to give color. However, these pigments absorb the visible light and heat the article by this absorbed light. To change the amount of light absorbed in the visible light region would change the color.

It would be particularly desirable to have color pigments, or other materials, which would reflect infrared energy and which would lower the heating of the article without changing the ultraviolet protection or the color thereof. In particular, it would be desirable to have a composition that is resistant to color change.

The art of compounding vinyl polymers is a very complex art which involves the "trade-off" of certain properties. That is, to improve one property, one must ordinarily take a reduction in another important property. It would be particularly desirable to be able to have improved color retention without sacrificing other important properties of a vinyl polymer compound.

Tin mercaptide stabilizers are very good for heat stability but the sulfur present causes poor light stability. Tin maleate stabilizers are known to give good light stability however they produce maleate vapors upon processing, which are very lacromatory and therefore unacceptable.

Vinyl halide compositions in dark colors, such as brown, are much more difficult to achieve color, light and heat stability than are light colors, such as white or pastel colors. The dark colors are more prone to be heated by the sun, which in turn has a detrimental effect on stability.

Color change can be measured by exposure in a QUV accelerated weathering tester using a cycle of 20 hours of light at 50° C. and 4 hours darkness with condensation at 40° C. The QUV tester is manufactured by the Q-Panel Company and uses type UV-B lamps with an energy peak at 313 nm. Color change measurements are done in $\Delta E$ which is calculated using Friele-MacAdam-Chickering equations as found in the article in Journal of the Optical Society, America, 58, 290 (1968) by G. Wyszecki. The color change for various rigid polyvinyl chloride materials range from about 3.69 to about 51.90 for 350 hours of testing. Color change of lower values of $\Delta E$ are desirable to improve the weatherability of polymer materials.

It would be desirable to have a dark color vinyl polymer composition which is stabilized against light, heat and color change, but which does not give off eye irritating vapors during processing.

SUMMARY OF THE INVENTION

It is an object of this invention to provide improved weatherable vinyl halide polymer compositions which have an excellent balance of heat, light and color stability properties.

It is also an object of this invention to provide improved weatherable vinyl halide polymer compositions which, in addition to having the excellent balance of properties mentioned above, are also non-lacromatory.

These and other objectives which will become evident from the disclosure are accomplished by a vinyl halide polymer composition comprising:
 (a) 100 parts by weight of vinyl halide polymer;
 (b) from about 1.0 to about 5.0 parts by weight of tin carboxylate stabilizer;
 (c) a coloring amount of brown infrared reflecting pigment;
 (d) up to about 1.0 part by weight of a sulfur containing stabilizer;
 (e) less than 0.5 part by weight of calcium stearate.

Said composition has a $\Delta E$ color change upon QUV accelerated weathering tester for 350 hours of less than about 4.0, a $\Delta E$ less than about 8.0 after 700 hours exposure, and a $\Delta E$ less than about 12.0 after 1050 hours exposure.

DETAILED DESCRIPTION

The first necessary ingredient of the novel composition of this invention is the vinyl halide polymer. The composition contains 100 parts by weight of vinyl halide polymer and all other levels of ingredients are based on 100 parts by weight of vinyl halide polymer.

Vinyl halide polymer, as used herein, refers to homopolymers and copolymers of vinyl halides and vinylidene halides, such as vinyl chloride, vinyl bromide, vinylidene chloride, etc. The vinyl halides and vinylidene halides may be copolymerized with each other or each with one or more polymerizable olefinic monomers having at least one terminal $CH_2=C<$ grouping. As examples of such olefinic monomers there may be mentioned the $\alpha,\beta$-olefinically unsaturated carboxylic acids, such as acrylic acid, methacrylic acid, ethacrylic acid, $\alpha$-cyanoacrylic acid, and the like; esters of acrylic acid, such as methyl acrylate, ethyl acrylate, butyl acrylate, octyl acrylate, cyanoethyl acrylate, and the like; esters of methacrylic acid, such as methyl methacrylate, butyl methacrylate, and the like; nitriles, such as acrylonitrile, methacrylonitrile, and the like; acrylamides, such as methyl acrylamide, N-methylol acrylamide, N-butoxy methacrylamide, and the like; vinyl ethers, such as ethyl vinyl ether, chloroethyl vinyl ether, and the like; the vinyl ketones; styrene and styrene derivatives, such as α-methyl styrene, vinyl toluene, chlorostyrene, and the like; vinyl naphthalene, allyl and vinyl chloroacetate, vinyl acetate, vinyl pyridine, methyl vinyl ketone; the diolefins, including butadiene, isoprene, chloroprene, and the like; and other polymerizable olefinic monomers of the types known to those skilled in the art. A blend of more than one vinyl halide polymer may be used for the vinyl halide component of the composition of this invention.

The present invention is particularly applicable to homopolymers and copolymers made by the polymerization of vinyl chloride or vinylidene chloride alone or in admixture with one or more polymerizable olefinic monomers copolymerizable therewith in amounts up to about 20% by weight, based on the weight of the monomer mixture. The most preferred vinyl polymer, or resin, is polyvinyl chloride homopolymer (PVC).

The second necessary ingredient for the composition of this invention is at least one tin carboxylate stabilizer. Preferred tin carboxylate stabilizers include those having the following formula:

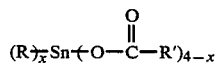

where R is an alkyl such as methyl, butyl, octyl, and the like, or an ester. X is normally 1 or 2. R' is normally an alkyl of about 8 to about 30 carbon atoms or R' may also be an aryl compound such as a phenyl. The tin carboxylate stabilizer is present at levels of from about 1.0 to about 5.0 parts by weight per 100 parts by weight of vinyl halide polymer. Preferably the level of tin carboxylate stabilizer is from about 2.0 to about 4.0 parts by weight per 100 parts by weight of vinyl halide polymer. A blend of more than one tin carboxylate stabilizer may be used in this invention.

The third necessary ingredient for the composition of this invention is an infrared reflecting pigment. The pigment serves the dual purpose of coloring the composition and reflecting the infrared light, thereby helping to reduce the heat generated in the compound. The level of infrared reflecting pigment used is the amount necessary to obtain the desired color. Usually a level of from about 0.25 to about 4.0 parts by weight per 100 parts by weight of vinyl halide polymer is used. Preferably from about 0.50 to about 2.00 parts by weight of infrared reflecting pigment is used per 100 parts by weight of vinyl halide polymer. A blend of more than one pigment may be used in this invention. A suitable brown infrared reflecting pigment is one sold by Ciba-Geigy under the tradename Chromathal Brown 5R.

The preferred colors of the compositions of this invention are what is normally referred to as mass tones. As such they do not contain $TiO_2$, as do white and pastel colors. The compositions of this invention are substantially free of $TiO_2$ pigment. Substantially free means that they contain less than 3.0 parts of $TiO_2$ per 100 parts by weight of vinyl halide polymer. Preferably $TiO_2$, is not present at all in the compositions of this invention. The mass tone colors are the dark or bright colors. Brown is a preferred color for the compositions of this invention. Brown is defined as any of a group of colors between red and yellow in hue that are medium to low in lightness, and low to moderate in saturation.

Optionally the compositions may also contain up to about 1.0 part by weight of a sulfur containing stabilizer per 100 parts by weight of vinyl halide polymer. Preferably the level of sulfur containing stabilizer is from about 0.25 to about 0.5 part by weight per 100 parts by weight of vinyl halide polymer. When sulfur containing stabilizers are used at levels greater than about the 1.0 part level, the heat stability is good but such stabilizers produce poor color stability in weathering of dark colors. Suitable sulfur containing stabilizer includes tin mercaptide. The use of maleate stabilizers will provide good light and color stability, however, they are poor for heat stability and such stabilizers produce maleate vapors upon processing which is undesirable.

Calcium stearate, a normal compounding ingredient for PVC, should be used, if at all, at levels of less than 0.5 part by weight per 100 parts by weight of vinyl halide polymer. Preferably calcium stearate is not used in the compositions of this invention, because it tends to decrease the light stability of the composition.

The compositions of this invention are rigid or semi rigid compounds and therefore they do not have high amounts of plasticizer present. The plasticizer level should be below about 40 parts by weight per 100 parts by weight of vinyl halide polymer.

In addition to the vinyl halide polymer, tin carboxylate stabilizers, infrared reflecting pigment and optionally sulfur containing stabilizer, the compositions of this invention may also contain minor amounts of other compounding ingredients. These ingredients include lubricants such as oils, stearic acid, processing aids, impact modifiers, epoxydized oils as co-stabilizers, antioxidants such as hydroxy phenyl compounds, UV screeners such as benzophenones and substituted acrylates, waxes, and colorants.

The vinyl polymer compositions of the present invention are useful in making any type of rigid or semirigid article which will be exposed to sunlight, and particularly for prolonged periods of time. However, the vinyl polymer compositions are particularly useful in making vinyl house siding and window profiles such as main frame, sash or glazing beads wherein weatherability is important and, likewise, the reduction of heat buildup in the siding or window in order to prevent or substantially reduce surface distortion.

The compositions of this invention also must have adequate dynamic heat stability. The dynamic heat stability should be at least 10 minutes and is preferably at least 15 minutes. Of course, dynamic heat stability as measured on the finished product will be somewhat lower than the stability as measured on the compound before it is shaped into the final product. Usually about 4 minutes of stability is used in processing from a compound to a finished product. Dynamic heat stability is measured by mixing in a Brabender mixing bowl at a 390° F. bowl temperature, until the Rheometer torque starts to increase due to degradation.

The compositions of the invention may be extruded or shaped into rigid profiles, siding, window profiles such as main frame, sash or glazing beads, shutters, and the like. The process of forming the compositions into useful finished products are well known and understood by those skilled in the art.

An important property that the compositions of this invention must have is a resistance to color change upon exposure to sunlight. Color change can be measured by exposure in a QUV accelerated weathering tester using a cycle of 20 hours of light at 50° C. and 4 hours darkness with condensation at 40° C. The QUV tester is manufactured by the Q-Panel Company and uses type UV-B lamps with an energy peak at 313 mm. Color change measurements are done in $\Delta E$ which is calculated using Friele-MacAdam-Chickering equations as found in the article in the Journal of the Optical Society, America, 58, 290 (1968) by G. Wyszeck.

The compositions of this invention have a $\Delta E$ color change in QUV accelerated weathering tester for 350 hours of less than about 4.0, a $\Delta E$ of less than about 8.0 after 700 hours, and a $\Delta E$ less than abut 12.0 after 1050 hours exposure. Preferably the $\Delta E$ is less than about 1.0 after 350 hours, 4.0 after 700 hours and 8.0 after 1050 hours. The most preferred compositions of this invention have a $\Delta E$ of less than about 2.0 after 4000 hours. Prior known compositions are normally not tested for 4000 hours because their color change is so great after 1050 hours that a 4000 hour test would be meaningless.

EXAMPLE I

In this example, a series of 5 rigid unplasticized PVC runs of house siding were made wherein color change of $\Delta E$ upon exposure in QUV accelerated weathering tester were made. The ingredients of each of the runs were mixed on a 2-roll mill for about 3 minutes at 340° F. The powder mix was extruded into house siding and the siding was cut into 6 inch×6 inch panels for testing.

TABLE I

|  | 1 | 2 | 3 | 4 | 5 |
|---|---|---|---|---|---|
| PVC Homopolymer Resin | 100 | 100 | 100 | 100 | 100 |
| Tin Mercaptide Stabilizer | 2 | — | — | 0.5 | 0.3 |
| Tin Carboxylate Stabilizer | — | 2 | 2 | 2 | 3 |
| Calcium Stearate | 2 | 2 | — | — | — |
| Co-Stabilizer | 2 | 2 | 2 | 2 | 2.5 |
| Processing Aid and Lubricant | 3 | 3 | 3 | 3 | 4.2 |
| Impact Modifier | 6 | 6 | 6 | 6 | 5 |
| UV Screener and Antioxidant | — | — | — | — | 0.5 |
| Brown Pigment (Chromathal Brown 5R) | 1 | 1 | 1 | 1 | 1 |
| Dynamic Heat Stability (min) | 16 | 10 | 8 | 12 | 19 |
| Color Change $\Delta E$ |  |  |  |  |  |
| 350 hours | 7.8 | 12.4 | 1.0 | 1.8 | .49 |
| 700 hours | 16.9 | 25.4 | 4.6 | 3.5 | 1.72 |
| 1050 hours | 25.7 | 38.8 | 7.1 | 11.2 | 1.45 |
| 4000 hours | — | — | — | — | 1.69 |

As can be seen from the above data, for the color change as measured by $\Delta E$ for the various compositions, runs 3, 4 and 5 are lower than runs 1 and 2 and, particularly, run 5 is significantly lower than the other 4 runs. Although runs 3 and 4 are within this invention, run 5 represents the optimized composition which is most preferred.

EXAMPLE 2

In this example, a series of commercially available rigid brown PVC materials were tested against a composition of this invention (Run No. 5 in Table I). The commercially available samples were all brown in color and were promoted for sale as rigid weather resistant PVC materials.

TABLE II

| Sample | Exposure Time (Hrs.) in QUV Accelerated Weathering Tests (E) | | | |
|---|---|---|---|---|
|  | 350 | 700 | 1050 | 4000 |
| Run No. 5 from Example 1 | .49 | 1.72 | 1.45 | 1.69 |
| Commercial Supplier No. 1 | 12.99 | 14.00 | 22.73 | —* |
| Commercial Supplier No. 2 | 11.10 | 18.20 | 15.20 | —* |
| Commercial Supplier No. 3 | 5.29 | 10.41 | 9.79 | —* |
| Commercial Supplier No. 4 | 3.69 | 6.06 | 36.12 | —* |

*Test was discontinued due to poor weathering ability of samples
[$\Delta E$ is color change calculated using Friele-MacAdam-Chickering equations (G. Wyszecki, Journal of the Optical Society, America, 58, 290 (1968)]

As can be seen from the above data, the color change as measured by $\Delta E$ is lowered when employing the composition of the present invention. The preferred composition of this invention had essentially no color change between 700 hours and 4000 hours of testing. This is very unexpected and a significant advancement in rigid PVC weatherable compounds compared to the commercially available material.

While the present invention has been described in terms of its specific embodiments, certain modifications and equivalents will be apparent to those skilled in the art and are intended to be included within the scope of the present invention, which is to be limited only by the scope of the appended claims.

We claim:

1. A rigid shaped article characterized by said article being formed from a vinyl halide polymer composition comprising:
    (a) 100 parts by weight of vinyl halide polymer;
    (b) from about 1.0 to about 5.0 parts by weight of non-maleate tin carboxylate stabilizer;
    (c) a coloring amount of an infrared reflecting pigment;
    (d) from 0 to less than about 1.0 part by weight of a sulfur containing tin stabilizer;
    (e) less than 0.5 part by weight of calcium stearate; wherein said composition has a $\Delta E$ color change upon QUV accelerated weathering tester for 350 hours of less than about 4.0, a $\Delta E$ less than about 8.0 after 700 hours exposure and a $\Delta E$ less than 12.0 after 1050 hours exposure; and wherein said composition has a dynamic heat stability greater than about 10.0 minutes wherein said article is substantially free of TiO$_2$.

2. An article of claim 1 wherein said article is house siding.

3. An article of claim 1 wherein said article is a window profile.

4. An article of claim 1 formed by extruding.

* * * * *